United States Patent [19]

Wakefield

[11] Patent Number: 5,088,813
[45] Date of Patent: Feb. 18, 1992

[54] FILM SCANNER

[75] Inventor: Edward H. Wakefield, Rochester, N.Y.

[73] Assignee: Eastman Kodak Company, Rochester, N.Y.

[21] Appl. No.: 559,489

[22] Filed: Jul. 27, 1990

[51] Int. Cl.⁵ .............................................. G03B 1/00
[52] U.S. Cl. .................................... 352/183; 352/221; 352/224
[58] Field of Search ................ 352/183, 221, 224, 225

[56] References Cited

U.S. PATENT DOCUMENTS

| | | | |
|---|---|---|---|
| 1,220,195 | 3/1917 | Cocanari | 352/183 |
| 2,314,027 | 3/1943 | Young | 178/11 |
| 3,109,924 | 11/1963 | Frederick | 235/61.11 |
| 3,139,790 | 7/1964 | Kipping | 352/183 |
| 3,938,721 | 2/1976 | Staneck et al. | 352/183 |
| 4,105,199 | 8/1978 | Sato et al. | 271/122 |
| 4,105,316 | 8/1978 | Söding et al. | 353/109 |
| 4,281,351 | 7/1981 | Poetsch et al. | 358/214 |
| 4,292,621 | 9/1981 | Fuller | 340/146.3 H |
| 4,320,963 | 3/1982 | Satomi | 355/50 |
| 4,427,273 | 1/1984 | Mackereth et al. | 352/183 |
| 4,429,333 | 1/1984 | Davis et al. | 358/293 |

FOREIGN PATENT DOCUMENTS 411914 4/1925 Fed. Rep. of Germany ...... 352/183

Primary Examiner—Monroe H. Hayes
Attorney, Agent, or Firm—Donald D. Schaper

[57] ABSTRACT

A film scanner is disclosed which comprises a dynamic film gate. The gate includes a pair of rollers for supporting the film at an imaging station and a pair of drive belts which clamp the film against the rollers. The belts are driven to advance the film through the imaging station. An integrating cylinder located above the film gate produces a line of light on the film, and light transmitted through the film in imaged onto a linear CCD image sensor. In order to insure that the end of the film is held flat at the imaging station, movable guides are provided to selectively engage the film adjacent the line of light on the film.

6 Claims, 3 Drawing Sheets

FILM SCANNER

REFERENCE TO RELATED APPLICATION

Reference is made to U.S. Applications Ser. No. 559,481, entitled "Film Scanner", filed in the name of Fetterman et al., and Ser. No. 559,249, entitled "Film Scanner," filed in the name of Wakefield, on even date herewith. These applications are assigned to the assignee of the present invention.

Field of the Invention

This invention relates to a film scanner, and more particularly, to such a scanner which is especially suitable for scanning film strips.

Background of the Invention

In various types of imaging apparatus, a photographic film must be clamped in a workstation while a particular operation is performed on the film. In certain types of apparatus, for example, film scanners, the film must be held extremely flat in order for an image on the film to be recorded properly. One problem in maintaining the film flat is that photographic film has a natural curl due to an emulsion coated on one side of the film. In one known type of film gate, a film is clamped against a flat platen, and the film and platen are moved relative to an image sensor to scan the film. In the use of such a film gate, the film must be clamped and unclamped for each film frame, and the film platen must be moved to a home position after each frame is scanned. Such a technique requires a significant number of moving parts, and it is relatively slow. Further, devices of this type are likely to scratch the film, and the motion of the platen introduces the possibility of vibrations into the system.

It is also known to use a rotary film gate, as disclosed, for example, in U.S. Pat. No. 4,281,351. U.S. Pat. No. 4,281,351 discloses apparatus for the line-by-line optical scanning of a film. In order to reduce friction of the film adjacent the scanning region, feed rollers or endless belts support the film at positions on the film outside of the film frames. A disadvantage of the apparatus disclosed in this patent is that the only means for maintaining the film flat in the scan region is through the tension in the film. Thus, any irregular motion in the drive system is transmitted to the film, and this tends to produce blurring in the scanned image. Further, the arrangement disclosed in the patent is not suitable for use with film strips which are too short to be mounted on the feed rollers.

SUMMARY OF THE INVENTION

It is an object of the present invention to overcome the problems in the prior art discussed above and to provide an improved film scanner.

In accordance with the present invention, there is provided a film scanner comprising: means for supporting a film at an imaging station; means for urging the film against the support means, the urging means contacting the film along an edge thereof; guide means for maintaining the film substantially flat in the imaging station, the guide means including a guide which is movable into and out of contact with the film; and means for advancing the film relative to the imaging station.

In one embodiment of the present invention, the film scanner comprises a pair of rollers which support the film as it passes through an imaging station. The film is pressed against the rollers by a pair of belts, and the belts are driven to advance the film through the imaging station. An illumination source provides a line of light on the film at the imaging station, and light transmitted through the film is imaged onto a CCD image sensor.

Center guides are located adjacent the rollers to guide film into a nip defined by the rollers and belts and to generally remove film curl before the rollers and belts obtain control. Movable guides are adapted to position the film in the imaging station.

An advantage of the present invention is that the film is advanced at a constant rate through the imaging station. The film can be driven at a selected scan speed and at a fast frame-to-frame advance, since the same motion serves to scan the film and advance the film to the next scan area. Drive belts provide for dynamic clamping of the film in the imaging station, and use of the belts eliminates the need for tensioning the film in the imaging station. Further, the belts are arranged to wrap the film around a portion of the rollers in a direction to remove the inherent curl of the film; this makes the film very flat in the imaging station, and as a result, imaging optics having a smaller depth of field can be used. The fixed and movable guides enable the scanner to function efficiently with film strips as well as rolls of film.

Other features and advantages will become apparent upon reference to the following Description of the Preferred Embodiment when read in light of the attached drawings.

DESCRIPTION OF THE PREFERRED EMBODIMENTS

Figure 1:
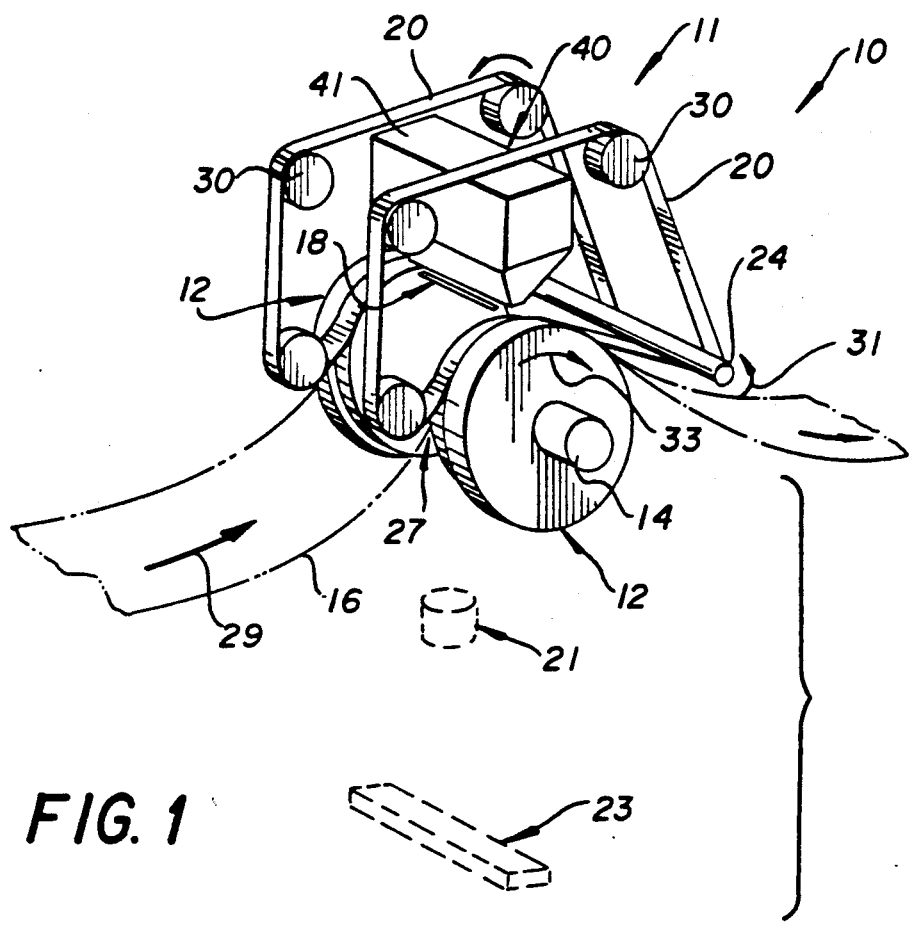
FIG. 1 is a perspective view of the film scanner of the present invention, with the film guides omitted.

With reference to FIG. 1, there is shown a film scanner 10 which is constructed in accordance with the present invention. Film scanner 10 comprises a dynamic film gate 11 which is adapted to support a film 16 as it is moved through an imaging station indicated at 18, an illumination source 40 which is adapted to provide a line source of light at station 18, an imaging lens 21, and a linear CCD image sensor 23.

Figure 2:
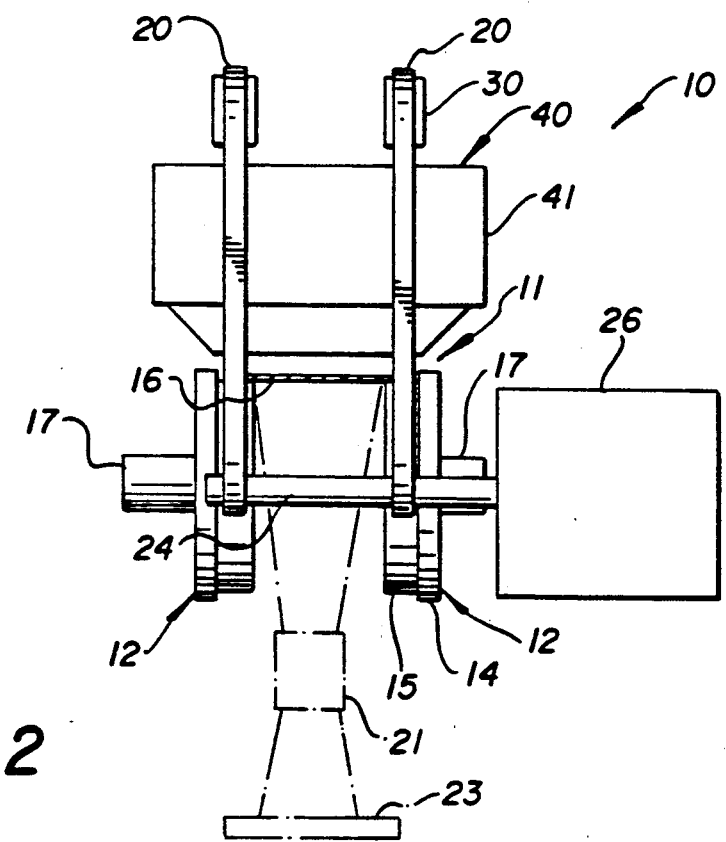
FIG. 2 is a side elevational view of the film scanner shown in FIG. 1.
Figure 3:
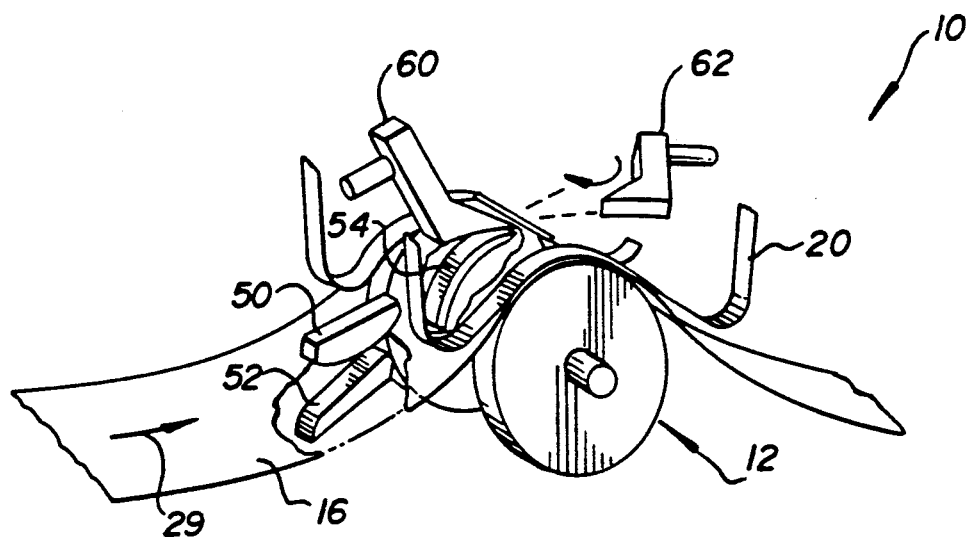
FIG. 3 is a perspective view of the film scanner with certain parts omitted in order to show the film guides more clearly.

Film gate 11 comprises a pair of rollers 12 and a pair of drive belts 20 which are adapted to clamp the film 16 against rollers 12 as the film is advanced through station 18. As shown in FIG. 2, each of the rollers 12 includes an outer cylindrical portion 14 and an inner cylindrical portion 15 of a reduced diameter. Each roller 12 includes a stub shaft 17 which is journalled in support structure (not shown) in the scanner 10. The rollers 12 are spaced such that the film 16 rides on the portions 15.

Figure 5:
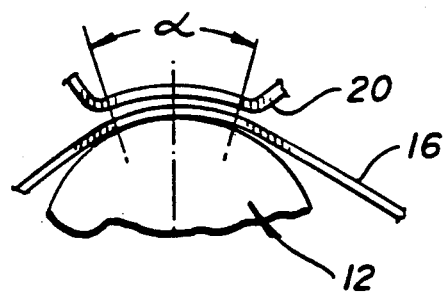
FIG. 5 is a schematic view showing the wrap of one of the belts on a roller.

Belts 20 are made of a length sufficient to provide a wrap angle α (FIG. 5) of about 60° on a roller 12. Each of the belts 20 is trained around idler pulleys 30, a roller 12, and a shaft 24 which is connected to a drive motor 26 (FIG. 2). Motor 26 can be, for example, a DC servo motor of a type well known in the art.

Each belt 20 is relatively narrow so that it only contacts an edge of the film and does not extend into the image area. The belts 20 can be constructed of a fiberglass core, or similar non-stretch material, which is coated on both sides with a urethane or similar high friction material. When film is fed to a nip 27 (FIG. 1) defined by rollers 12 and belts 20, a pinching action on the film 16 will capture the film 16 and pull it into the interface; the film 16 will be driven in the direction of arrow 29 as shaft 24 and rollers 12 move in the direction of arrows 31 and 33, respectively. The film 16 will be advanced a constant rate of speed which is controlled by the speed of motor 26.

Illumination source 40 is mounted above the film 16 and is adapted to provide a line of illumination at the imaging station 18. Light transmitted through the film is imaged onto linear CCD image sensor 23 by means of lens 21. The illumination source 40 includes an integrating cylinder 41 and a lamp (not shown) such as a 24 V DC tungsten halogen lamp, type ELC, sold by the General Electric Co. The integrating cylinder 41 can be, for example, an integrating cylinder as disclosed in U.S. Pat. No. 4,868,383, to Kurtz et al., granted Sept. 19, 1989. The integrating cylinder disclosed therein produces a line of diffuse illumination which has a uniform linear and angular distribution.

Image sensor 23 can be a linear CCD image sensor such as a No. KLI-5001A/B sensor, manufactured by Eastman Kodak Co., Rochester, N.Y. The image sensor can also include an array which consists of three separate photodiode linear arrays for capturing red, green, and blue signals. The image sensor 23 must be precisely located relative to scanning station 18, and to this end, it can be supported in a mount as disclosed in U.S. patent application Ser. No. 381,897, filed July 19, 1990. Signals from image sensor 23 can be processed in a well known manner in order to produce an electronic record of the images on film 16.

Figure 7A:
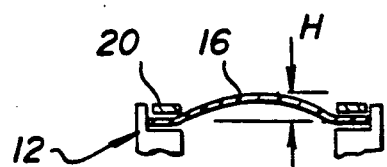
FIGS. 7a–7d are views showing the curl in the film at various points in the film strip shown in FIG. 6.

Scanner 10 is particularly suitable for use in scanning film 16 in the form of film strips. As will be explained in detail hereinafter, there is a problem in maintaining the end of a film flat in the imaging station. The end of the film tends to have a curl across its width, as shown in FIG. 7a in which H is the height of the curl. In rolls of film, the end of the film is normally a non-image-bearing leader which moves through the film gate before the scanning of images starts, and thus, the problem of holding the end of the film flat is not present. In the scanning of film strips, however, it is common for an image to be adjacent the end of the film strip, and consequently, a means must be found to keep the end of the film flat.

Figure 6:
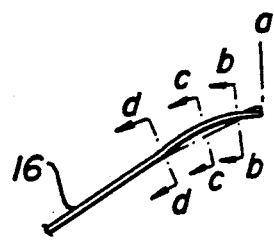
FIG. 6 is a schematic view illustrating the shape assumed by an end of a film strip in the film gate in the absence of guides.
Figure 7B:
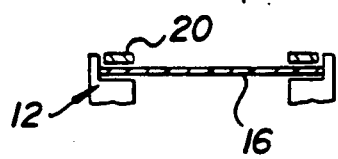
Figure 7C:
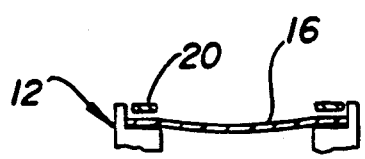
Figure 7D:
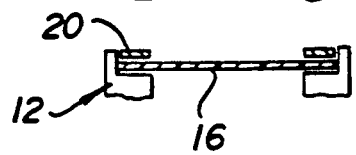

With reference to FIG. 6, there is shown a front view of a film strip in the shape it assumes in the film gate 11 in the absence of film guides, and in FIGS. 7a-7b, the curl in the film is shown for various points identified in FIG. 6. An end view of the film 16 (point a in FIG. 6) is shown in FIG. 7a, and in FIGS. 7b-7d, there are shown cross sections of film 16 taken along lines b—b, c—c, and d—d, respectively, in FIG. 6. A curl in the film 16 at end point a (FIG. 7a) typically has a height H of about 0.040 inch; this curl continues back into the film for a distance of approximately ½ image, gradually changing in shape through that distance to line b—b where the film 16 becomes flat as shown in FIG. 7b. The film 16 develops a very subtle negative curl at line c—c (FIG. 7c), and the film becomes flat again at line d—d (FIG. 7d). The film 16 will maintain the flat condition, unique to a radial film gate such as film gate 11, until the trailing end of the film arrives in gate 11. A similar set of conditions occur with the trailing end of film 16 as those just described for the leading end.

As an end of film 16 is guided into nip 27, the two rollers 12 support the film at its sides and define its radius, and the belts 20 clamp the film 16 to the rollers to maintain the radius and a controlled transport speed. The forces on the film 16 from the rollers 12 and the belts 20 tend to prevent any side motion of the film. If end of film 16 has curl as it moves into the nip 27, the curl will remain in the end of the film as the film is captured and controlled by the belts 20 and rollers 12. As the film 16 starts around the rollers 12, it will have two forces attempting to control its shape: the inherent curl locked in by the belt pressure, and the roller-induced lengthwise curl. As a result of these forces, the sides of a film are controlled by the rollers 12 while the center area of the film 16 attempts to keep going straight. This can result in the film being pulled out from under the belts 20 or in the curl reversing directions, i.e., the center portion moving from a position above the film sides to a position below the sides, usually after the image leading edge has passed the imaging station 18.

In order to overcome the conditions described above and to maintain an end of film 16 flat in the imaging station 18, film 16 is guided into nip 27 by stationary center guides 50 and 52, and the film is engaged by movable guides 60 and 62 at the imaging station 18. Center guides 50 and 52 substantially remove film curl before the end of film 16 is engaged by rollers 12 and belts 20. With the film curl substantially removed, the rollers 12 can freely control the film lengthwise through the film gate 11. As the film 16 is advanced toward imaging station 18 by belts 20 and rollers 12, it is supported along a center portion by a fixed center rail 54 which is positioned generally on the inner radius of the film. Rail 54 keeps the film 16 from curling inward in the film gate 11.

Figure 4:
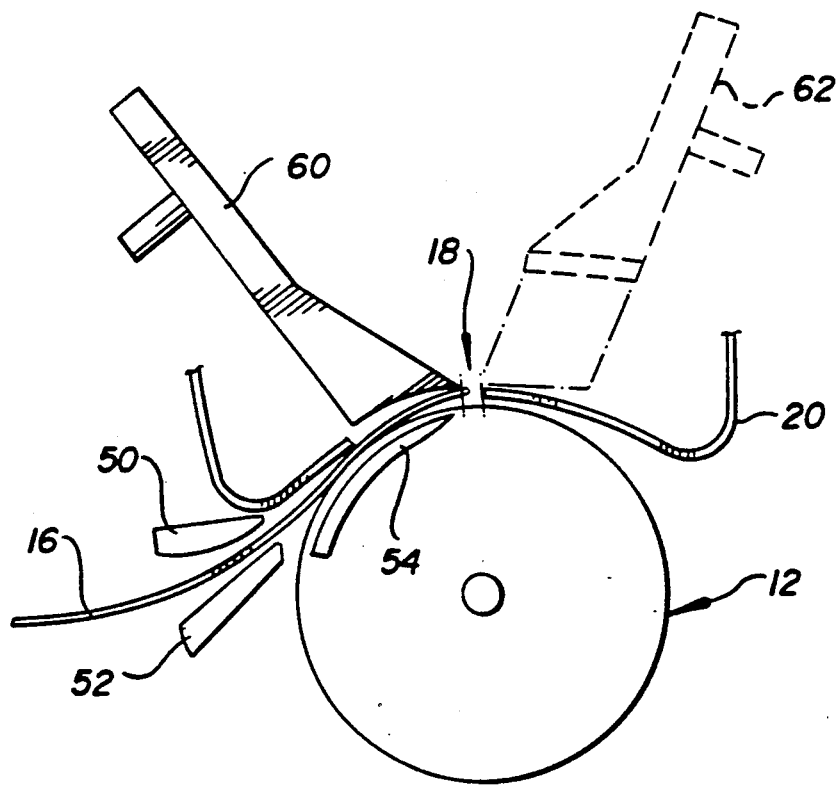
FIG. 4 is a front elevational view showing the film supported in the film gate on one roller and showing the positions of the film guides in the gate.

Movable guide 60 is positioned at imaging station 18 just outside of line of illumination from illumination source 40. As shown in FIG. 4, guide 60 engages the end of film 16 to remove the curl from the film. Movable guide 60 is adapted to be pivotally mounted, and can be moved into and out of contact with film 16 by means of, for example, a rotary solenoid such as a Ledex TM solenoid, type H-1141-033 or H-1151-033. Since guide 60 would have very little contact with film 16 when there is no curl in the film, the guide 60 can be left in position during the completion of the scan; however, it is preferable to pivot the guide 60 away from the film once the end of the film 16 has passed through the film gate. Photosensors (not shown) can be used to sense the position of the film end and to effect the positioning of guide 60 in a manner well known in the art.

Movable guide 62 is positioned opposite guide 60 at imaging station 18. Guide 62 is adapted to move into position when the last image on film 16 is approaching the imaging station 18. Guide 62 is actuated in the same manner as guide 60. Center guides 50, 52, and movable guides 60, 62, are preferably made from a low friction material such as the materials sold under the trademarks Delrin and Teflon.

From the foregoing, it will seen that guides 60 and 62, located at the entrance and exit to imaging station 18, function to remove the curl from the leading and trailing ends of a film 16. The guides 60, 62, can be used to feed film in both directions, and in the event that film is moved in a direction opposite to arrow 29, the sequence described above would be followed with guide 62 being actuated for the leading end and guide 60 being actuated for the trailing end of the film.

In operation of the film scanner 10, a film 16, for example, a 35 mm film is threaded into the gate 11, and the film is advanced therein by means of the belts 20 bearing on rollers 12. Guides 60 and 62 are actuated when ends of the film 16 are presented to the imaging station 18. The image is scanned in a page scan direction as the film 16 moves through imaging station 18, and the line scan is performed by the clocking of the individual image elements in the sensor 23.

The invention has been described in detail with particular reference to the preferred embodiments thereof, but it will be understood that variations and modifications can be effected within the spirit and scope of the invention.

I claim:

1. A film scanner comprising:
   means for supporting a film at an imaging station;
   means for urging film against said support means, said urging means contacting said film along an edge thereof;
   guide means for maintaining said film substantially flat in said imaging station, said guide means including a guide which is pivotally movable into and out of contact with said film, said guide means further including a center rail located adjacent said supporting means; and
   means for advancing said film relative to said imaging station.

2. A film scanner, as defined in claim 1, wherein said guide means includes a second pivotally-mounted guide.

3. A film scanner comprising:
   a pair of spaced-apart rollers for supporting a film at an imaging station;
   belt means for urging the film against said rollers, said belt means including a first endless belt which urges one edge of said film against one of said rollers and a second endless belt which urges an opposite edge of said film against the other of said rollers;
   guide means for guiding said film in said scanner, said guide means including center guides for guiding said film into a nip between said belt means and said rollers and movable guides for maintaining said film flat in said imaging station; and
   means for driving said belt means to advance the film relative to an illumination means.

4. A film scanner, as defined in claim 3, wherein each of said rollers includes a first portion of one diameter and a second portion of a diameter less than said one diameter, and said film is supported on said second portions.

5. A film scanner, as defined in claim 4, wherein each of said belts is adapted to extend around a predetermined circumferential portion of a roller in order to clamp said film against the roller in said portion.

6. A film scanner, as defined in claim 5, wherein said circumferential portion extends around an angle of about 60°.

* * * * *